INVENTOR.
WILHELM NOBIS
BY
AGENT

United States Patent Office 3,464,004
Patented Aug. 26, 1969

3,464,004
AUTOMATIC BALANCING A.C. BRIDGE INCLUDING RESISTIVE AND REACTIVE BALANCING ELEMENTS CONNECTED ACROSS THE INPUT AND TO THE OUTPUT OF THE BRIDGE
Wilhelm Nobis, Merzhausen im Breisgau, Germany, assignor to Fritz Hellige & Co., G.m.b.H., Freiburg im Breisgau, Germany
Filed Aug. 3, 1965, Ser. No. 476,835
Claims priority, application Germany, Aug. 4, 1964, H 53,479
Int. Cl. G01r 27/02
U.S. Cl. 324—57                4 Claims

ABSTRACT OF THE DISCLOSURE

A device for automatically balancing an alternating current bridge. Reactive and resistive balancing means are coupled between the bridge and an alternating current generator. Circuit means are connected to the alternating current generator and the output of said bridge for separating the unbalance components of the output signal from said bridge. Servo means are connected to said reactive and resistive balancing means and may be coupled to said circuit means for ensuring the automatic balancing of the resistive and reactive components of the output signal from said bridge.

---

The present invention relates to alternating current bridge circuits and more particularly to self-balancing alternating current bridge circuits. Such bridge circuits may be employed for measuring a physical quantity which modifies an electrical parameter such as resistance, capacitance or inductance. A bridge employed in this manner must be brought into balance prior to measurement of the physical quantity. To balance such a bridge manually, a resistance element must be varied to compensate for resistive unbalance and a reactive element must be adjusted to compensate for reactive unbalance. Since adjustment of one error may also affect the other type of error, manual balancing requires several steps of balancing out resistive errors and then balancing out reactive errors. In the present invention, balancing of the bridge prior to use is done automatically by pushing a button. Servo motors connected to the resistive and reactive balancing elements are varied simultaneously balancing the bridge for both resistive and reactive errors.

It is therefore, an object of this invention to provide an automatically balancing alternating current bridge.

Another object of this invention is to provide an alternating current bridge with balancing means responsive to the unbalanced bridge output signal.

Another object of this invention is to provide means for separating the resistive and reactive unbalance signals and applying them to resistive and reactive servo systems.

Another object of this invention is to provide an automatic alternating current bridge balancing means which is accurate, simple to use, and inexpensive to manufacture.

These and other objects and advantages of the present invention will become apparent from the following specification and appended drawings, wherein.

Figure 1:
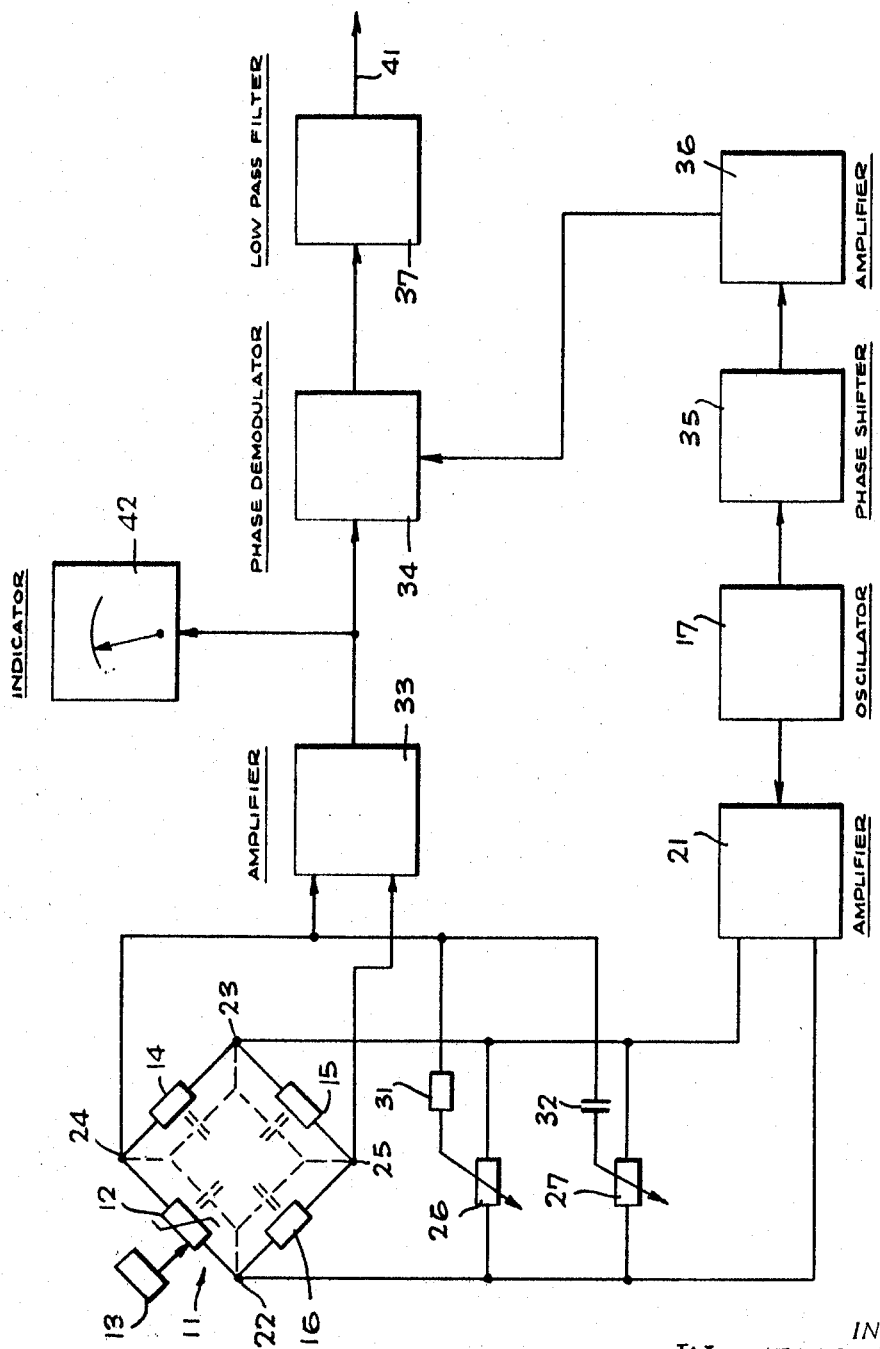
FIGURE 1 illustrates a manually balanced alternating current bridge.

Referring now to FIGURE 1, an alternating current bridge 11 is illustrated. A transducer 12 forms one of the arms of the bridge. Transducer 12 may vary in resistance, inductance or capacity in response to the physical quantity which is to be measured. As is well known to those skilled in the art, an alternating current bridge, even if shielded and grounded, retains residual and stray reactances, mainly capacity. Such stray capacities are shown as dashed lines in the illustration.

As is conventional in alternating current bridges, impedances 14 and 15 form a ratio arm, while impedance 16 is usually a standard whose value is accurately known. An audio frequency oscillator 17 supplies alternating voltage to points 22 and 23 of bridge 11 through a buffer amplifier 21. The audio frequency voltage is also applied to potentiometers 26 and 27. Potentiometer 26 supplies a resistive error balancing voltage through resistor 31 to point 24 on the bridge while a reactive balancing voltage is supplied by potentiometer 27 through quadrature phase shifting capacitor 32 to point 24 on the bridge. The unbalanced bridge output voltage is taken from points 24 and 25 and applied to a buffer amplifier 33.

A phase demodulator 34, connected to the output of buffer amplifier 33 is employed to determine the sense and amplitude of an unbalanced signal. The bridge output signal from amplifier 33 is compared with the reference alternating frequency signal supplied by oscillator 17. The reference signal from oscillator 17 is applied to phase demodulator 34 through a phase shifter 35 and a buffer amplifier 36. Phase shifter 35 is employed to compensate for any phase shifter in the amplifier. As is well known to those skilled in the art, the output signal of a phase demodulator such as 34 is a pulsating DC signal having an amplitude proportional to the phase difference and a polarity indicating the sense of such difference. A suitable low pass filter 37 removes the pulsations, and a direct voltage output on lead 41, having an amplitude indicating the amount of unbalance and polarity indicating the sense thereof, is provided on line 41, which may be connected to a suitable indicating, recording or utilization instrument. A suitable alternating current meter or indicator 42 connected between amplifier 33 and phase demodulator 34 is provided to assist in the initial balancing of the bridge as will be discussed hereinbelow.

In the operation of the bridge of FIGURE 1, a suitable transducer 13 is connected to the bridge and the equipment is turned on. The bridge is first balanced by varying potentiometers 26 and 27 to provide a zero indication on indicator 42. Phase shifter 35 is then adjusted to give a zero output on lead 41. This adjustment is relatively constant and would not normally be repeated. The transducer 13 is then connected to the physical system to be monitored and bridge unbalance would appear as a phase shift at phase demodulator 34. This phase shift results in a phase difference between the two signals applied to the phase demodulator, and an output signal will appear on line 41 having a voltage representing the amplitude of the physical quantity measured by transducer 13 and a polarity indicating the sense thereof.

Figure 2:
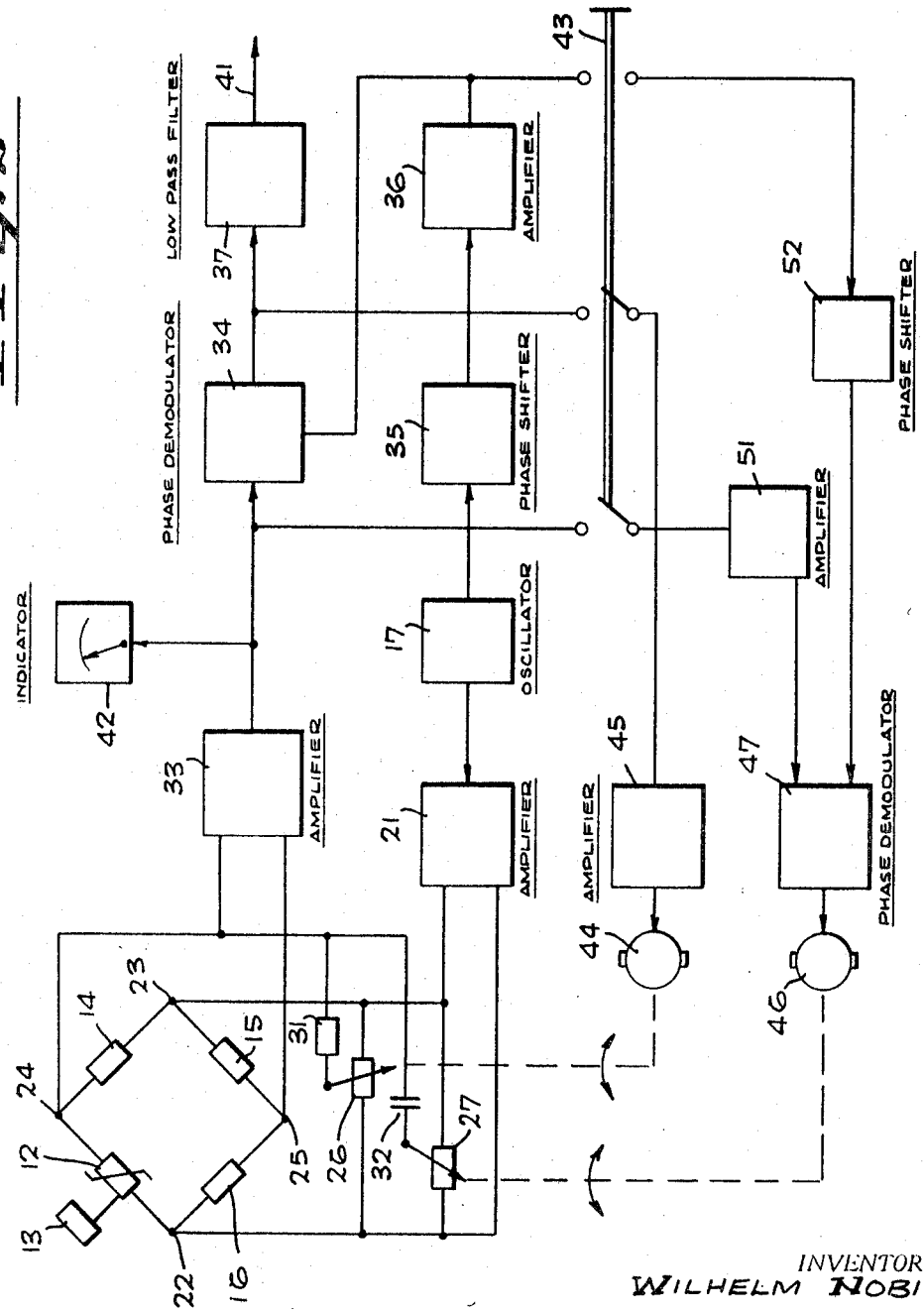
FIGURE 2 illustrates a first embodiment of the present invention.

As discussed hereinabove, balancing the bridge prior to use by varying potentiometers 26 and 27 is a tedious time consuming task. In the circuit shown in FIGURE 2, including the bridge circuit of FIGURE 1, and wherein like parts have like numbers, balancing may be accomplished simply by pushing a button. A three pole single throw switch 43 connects an automatic balancing circuit to the basic bridge circuit, enabling automatic adjustment of potentiometers 26 and 27. Switch 43 is preferably of the spring loaded self opening type. A DC servo motor 44 adjusts potentiometer 26. Motor 44 is connected to the output of phase demodulator 34 through DC amplifier 45. Potentiometer 27, compensating for reactive quadrature unbalance, is adjusted by a DC servo motor 46. Motor 46 is connected to the output of phase demodulator 47. Phase demodulator 47 is responsive to the output signal from the bridge 11, applied through buffer amplifier 51, and to the signal from oscillator 17 applied through a phase shifter 52. For the purpose of automatic bridge compensation, the complex bridge unbalance is divided into its real and imaginary components, and each of these two unbalanced components is used for driving one of the motors. The output voltage from the bridge may be expressed as $U = A + JB$ wherein A is the real, or resistive component and JB is the imaginary, or reactive component of the output voltage. Since only the resistive component is present at the output of phase demodulator 34, this direct voltage is applied through DC amplifier 45 to motor 44. Motor 44 adjusts potentiometer 26 to a zero unbalance condition. The complex output voltage from the bridge is applied to phase demodulator 47 through amplifier 51. The reference voltage from oscillator 17 is also applied to phase demodulator 47 through phase shifter 52, amplifier 36 and phase shifter 35. Phase shifter 52 is adjusted so that there would be a normal 90 degree phase difference between the balanced bridge output and the signal applied from oscillator 17. Any other phase difference results in a DC output from phase demodulator 47, which is applied to servo motor 46. Servo motor 46 is driven in the direction to adjust potentiometer 27 to provide zero reactive unbalance of the bridge.

Figure 3:
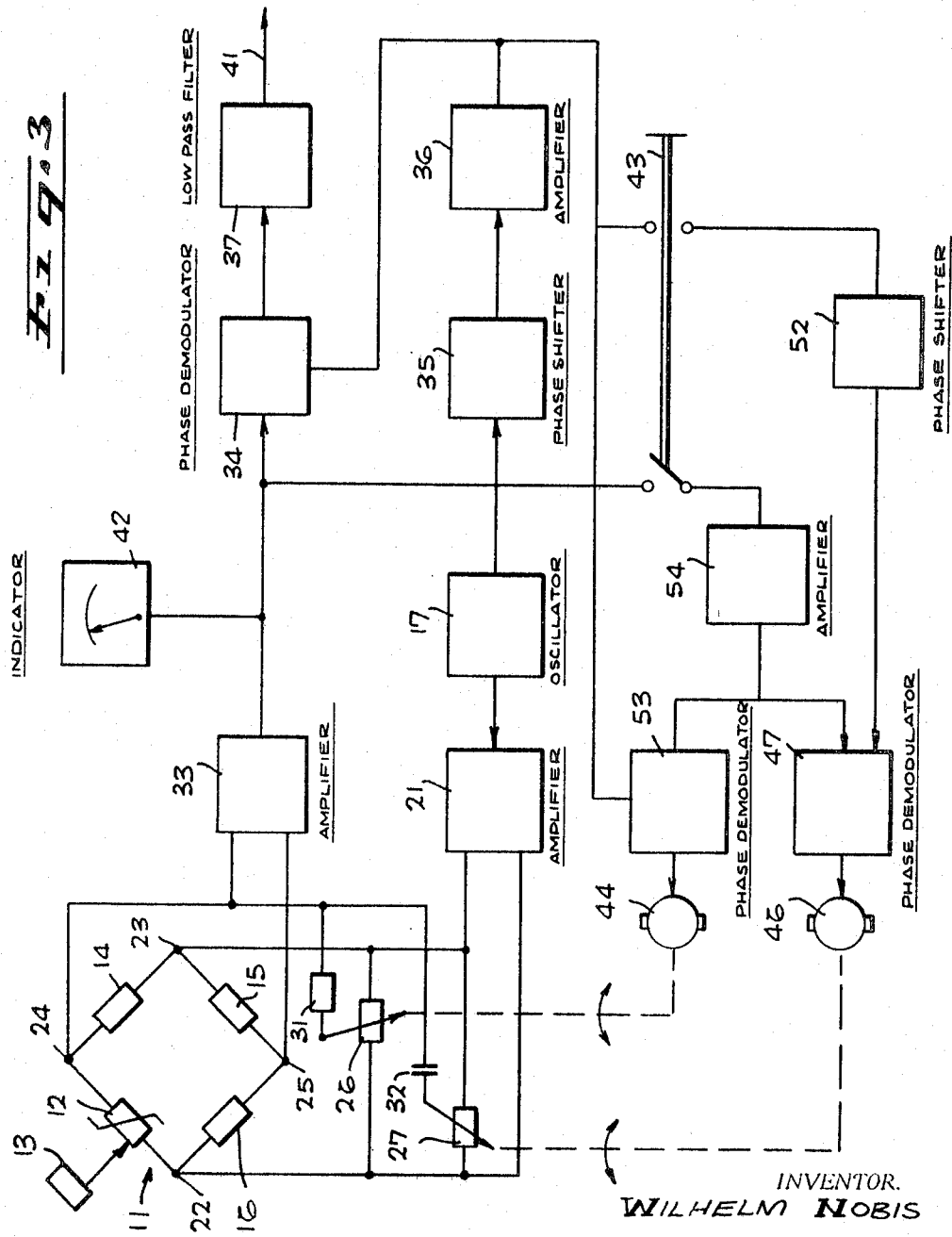
FIGURE 3 illustrates a second embodiment of the present invention.

A further embodiment of this invention is illustrated in the block diagram of FIGURE 3. In this embodiment, the alternating voltage which appears at the output terminals of amplifier 33 when the bridge is unbalanced, and there is no input of the magnitude to be measured, is applied to phase demodulators 47 and 53 through a buffer amplifier 54. Both of demodulators 47 and 53 are connected to oscillator 17 through phase shifter 35 and amplifier 36. An additional phase shifter 52 is connected in a circuit with phase demodulator 47 to provide a 90 degree phase shift between the voltage supply to phase demodulator 47 and phase demodulator 53. As a result, the output voltage of phase demodulator 53 is proportional to the real, or resistive, bridge unbalance component, and the output of the 90 degree phase demodulator 47 is proportional to the imaginary or reactive bridge unbalance component. These output voltages are applied to servo motors 44 and 46 respectively. Servo motor 44, driven by the resistive bridge unbalance component, adjusts potentiometer 26 to compensate for resistive unbalance. Similarly, servo motor 46 drives potentiometer 27 to apply the reactive correcting voltage to the bridge 11. In this circuit, a two pole, single throw, spring-loaded push button switch 43 connects amplifier 54 and phase shifter 52 into the circuit, operating motors 44 and 46 to correct the unbalance. The effect is indicated on indicator 42, and when indicator 42 reads zero the bridge is ready for use. Transducer 13 may then be operated upon by the physical force and the sense and magnitude of that force will be indicated as a direct voltage output on output lead 41.

What is claimed is:

1. A device for automatically balancing an alternating current bridge comprising:
   alternating current bridge having a first arm including a transducer, a second arm including an impedance standard, a third arm including a first impedance and a fourth arm including a second impedance;
   reactive balancing means connected across the input and to the output of said alternating current bridge for facilitating the balancing of the reactive component of the output signal from said bridge;
   resistive balancing means connected in parallel to said reactive balancing means and connected to said alternating current bridge for facilitating the balancing of the resistive component of the output signal from said bridge;
   an alternating current generator connected to said reactive balancing means and said resistive balancing means for applying signals to said bridge, said alternating current generator having a first and second lead connecting to a common point of said transducer and said impedance standard and to a common point of said first impedance and said second impedance, respectively;
   phase controlling means having a first and second lead connected to a common point of said impedance standard and said first impedance and to a common point of said transducer and said second impedance, respectively, and further connected to said alternating current generator for receiving the output of said alternating current bridge and for establishing resistive and reactive components of the output from said alternating current bridge; and
   servo balancing means selectively coupled to the respective outputs of said phase controlling means and connected to said reactive balancing means and said resistive balancing means for adjusting said reactive balancing means and said resistive balancing means, respectively.

2. A device for automatically balancing an alternating current bridge comprising:
   alternating current generator means for applying signals to said bridge;
   reactive balancing means connected across the input and to the output of said bridge and said generator means for facilitating the balancing of said bridge;
   resistive balancing means connected across the input and to the output of said bridge and said generator means for facilitating the balancing of said bridge;
   a first phase shifter connected to said generator means;
   a first phase sensitive demodulator connected to said bridge and to said first phase shifter;
   a second phase shifter;
   a first servomotor connected to said reactive balancing means for ensuring the automatic balancing of the reactive component of the output from said bridge;
   second servomotor coupled to said resistive balancing means for ensuring automatic balancing of the resistive component of the output signal from said bridge;
   a second phase sensitive demodulator connected between said second phase shifter and said first servomotor;
   a third phase sensitive demodulator connected to said second servomotor and said first phase shifter;
   switching means for coupling said second phase shifter to said first phase shifter and for further coupling the output from said bridge to said second phase sensitive demodulator and said third phase sensitive demodulator; and
   a bridge balance indicator connected to the output of said bridge.

3. A device for automatically balancing an alternating current bridge comprising:
   alternating current bridge having a first arm including a transducer, a second arm including an impedance standard, a third arm including a first impedance and a fourth arm including a second impedance;
   reactive balancing means connected across the input and to the output of said alternating current bridge for facilitating the balancing of the reactive component of the output signal from said bridge;
   resistive balancing means connected in parallel to said reactive balancing means and connected to said alternating current bridge for facilitating the balancing of the resistive component of the output signal from said bridge;
   an alternating current generator connected to said reactive balancing means and said resistive balancing means for applying signals to said bridge, said alternating current generator having a first and second lead connected to a common point of said transducer and said impedance standard and to a common point of said first impedance and said second impedance, respectively;

first phase controlling means having a first and second lead connected to a common point of said impedance standard and said first impedance and to a common point of said transducer and said second impedance, respectively, and further connected to said alternating current generator for receiving the output of said alternating current bridge and for establishing resistive and reactive components of the output from said alternating current bridge;

second phase controlling means selectively coupled to said first phase controlling means for receiving said respective outputs from said first phase controlling means; and servo means connected to the respective outputs of said second phase controlling means and connected to said reactive balancing means and said resistive balancing means for adjusting said reactive balancing means and said resistive balancing means, respectively.

4. A device for automatically balancing an alternating current bridge comprising:

alternating current bridge having a first arm including a transducer, a second arm including an impedance standard, a third arm including a first impedance and a fourth arm including a second impedance;

reactive balancing means connected across the input and to the output of said alternating current bridge for facilitating the balancing of the reactive component of the output signal from said bridge;

resistive balancing means connected in parallel to said reactive balancing means and connected to said alternating current bridge for facilitating the balancing of the resistive component of the output signal from said bridge;

an alternating current generator connected to said reactive balancing means and said resistive balancing means for applying signals to said bridge, said alternating current generator having a first and second lead connected to a common point of said transducer and said impedance standard and to a common point of said first impedance and said second impedance, respectively;

a first phase shifter connected to said alternating current generator;

phase controlling means having a first and second lead connected to a common point of said impedance standard and said first impedance and to a common point of said transducer and said second impedance, respectively, and further connected to said first phase shifter for receiving the output of said alternating current bridge and for establishing resistive and reactive components of the output from said alternating current bridge;

a second phase shifter selectively coupled to said first phase shifter;

second phase controlling means selectively coupled to said first phase controlling means and said first phase shifter and further connected to said second phase shifter for receiving said respective outputs from said first phase controlling means and said first phase shifter;

servo means connected to the respective outputs of said second phase controlling means and connected to said reactive balancing means and said resistive balancing means for adjusting said reactive balancing means and said resistive balancing means, respectively; and a bridge balance indicator connected to said first phase controlling means.

References Cited

UNITED STATES PATENTS 2,972,106  2/1961  Hyrne _____ 324—57

OTHER REFERENCES

Graham, J. F., Automatic A.C. Bridges, in Electronics, February 1951, pp. 110–116, TK7800E58.

EDWARD E. KUBASIEWICZ, Primary Examiner

U.S. Cl. X.R.

318—28